(12) United States Patent
He

(10) Patent No.: US 6,983,158 B2
(45) Date of Patent: Jan. 3, 2006

(54) MULTIPLE BASE STATION MONITORING OF DIGITAL PAGING CHANNEL TO REDUCE AN OCCURRENCE OF MISSED PAGES BY A MOBILE STATION

(75) Inventor: Tao He, San Diego, CA (US)

(73) Assignee: Nokia Corporation, Espoo (FI)

( * ) Notice: Subject to any disclaimer, the term of this patent is extended or adjusted under 35 U.S.C. 154(b) by 76 days.

(21) Appl. No.: 10/373,460

(22) Filed: Feb. 25, 2003

(65) Prior Publication Data
US 2004/0166882 A1    Aug. 26, 2004

(51) Int. Cl.
*H04Q 7/20*    (2006.01)
(52) U.S. Cl. .............. 455/458; 455/436; 455/437; 455/442; 455/515
(58) Field of Classification Search ........... 455/458, 455/426.1, 515, 436, 437, 438, 439, 442, 455/524, 525, 434
See application file for complete search history.

(56) References Cited

U.S. PATENT DOCUMENTS

| | | | |
|---|---|---|---|
| 5,327,439 A | 7/1994 | Estola et al. ............ | 371/43 |
| 5,375,129 A | 12/1994 | Cooper ................. | 371/43 |
| 5,796,757 A | 8/1998 | Czaja .................. | 371/46 |
| 5,920,549 A * | 7/1999 | Bruckert et al. ........ | 455/436 |
| 5,944,844 A | 8/1999 | Piirainen et al. ....... | 714/704 |
| 5,950,131 A * | 9/1999 | Vilmur ................ | 455/434 |
| 6,011,971 A | 1/2000 | Jolma ................. | 455/438 |
| 6,097,954 A * | 8/2000 | Kumar et al. .......... | 455/442 |
| 6,456,849 B1 | 9/2002 | Purnadi et al. ........ | 455/453 |
| 6,463,031 B1 | 10/2002 | Tran .................. | 370/203 |
| 6,507,568 B2 * | 1/2003 | Kumar et al. .......... | 455/525 |

FOREIGN PATENT DOCUMENTS

EP    0446745 A2    9/1991

* cited by examiner

*Primary Examiner*—Joseph Feild
*Assistant Examiner*—Huy D. Nguyen
(74) *Attorney, Agent, or Firm*—Harrington & Smith LLP

(57) ABSTRACT

This invention provides a method to operate a mobile station (60) and a mobile station that operates in accordance with the method. The method includes: (a) simultaneously demodulating a digital paging channel (DPCH) from individual ones of N base stations using a plurality of fingers (78), where N is greater than one; (b) soft combining (82A,82B) the outputs of those fingers that receive the DPCH from an individual one of the N base stations and storing the combined soft outputs in an individual one of N buffers (84A,84B); and (c) separately decoding (90) the content of each of the N buffers to determine if a page for the mobile station was received from at least one of the N base stations.

18 Claims, 3 Drawing Sheets

MULTIPLE BASE STATION MONITORING OF DIGITAL PAGING CHANNEL TO REDUCE AN OCCURRENCE OF MISSED PAGES BY A MOBILE STATION

TECHNICAL FIELD

This invention relates generally to wireless communications systems and methods and, more specifically, relates to cellular telephone systems wherein a mobile station, such as a cellular telephone or a personal communicator, receives a digital paging channel from one or more base stations for detecting the presence of an incoming call.

BACKGROUND

Mobile station call termination, that is, the ability to detect the presence of an incoming call from the wireless network, is a critical performance issue that is of significant importance to wireless network operators. Typically, the success rate of the mobile station is expected to be very close to 100% under optimum signal conditions, and as high as possible under weak signal conditions.

A failure to properly achieve mobile station call termination can be referred to as a Failure to Terminate (FTT). In most instances a FTT can be caused by the mobile station missing an incoming paging message from the network, or by failing to correctly access the network after receiving an incoming paging message (failure to receive a page), or by a failure to receive a base station acknowledgment (BS_ACK) when attempting to establish a traffic channel in order to handle the call. Of these various failure mechanisms, the failure to receive the page is the most predominant.

In a cellular communication system of most interest to the teachings of this invention, i.e., a Spread Spectrum (SS), Code Division Multiple Access (CDMA) system, the mobile station is enabled to perform soft combining of a traffic channel received from one base station over multiple paths (multi-path), as well to perform soft combining of more than one digital traffic channel (DTCH) received from two or more base stations. This latter technique is typically used during a soft handoff from one base station to the other while the mobile station transitions from the coverage area of one to the other. However, this type of conventional soft combining is not possible when the mobile station is instead receiving and monitoring a digital paging channel (DPCH), as there is, at any given time, only one base station defined in the active base station set. As an example, when a slot cycle index of 1 is used, from slot to slot there is a time separation of 2.56 seconds. During this period of time the signal received from the base station in the active set can change dramatically as a function of at least the mobile station speed and the presence of signal-attenuating obstructions. For example, at slot N, if one assumes that the active pilot channel signal strength is −15 dB, then at slot N+1 (2.56 seconds later) the active pilot signal strength can be reduced to, for example, −19 dB, a figure that is sufficient for the mobile station to re-acquire the system time, but insufficient to enable reliable decoding of the paging channel during slot N+1. The end result is that a page sent to the mobile station can be missed, resulting in the occurrence of the FTT.

It should be noted that at slot N+1 there may be a neighbor base station that has adequate signal strength, and whose paging channel contains the page to the mobile station; however this paging channel is not being monitored or decoded by the mobile station.

It is known in the prior art to attempt to alleviate this problem by performing idle handoffs before the paging channel signal becomes too weak to use. However, this approach assumes that the signal strength will not be reduced by too great an amount between slots (i.e., during the 2.56 seconds assuming that the slot cycle index of 1 is in effect). However, when using the slot cycle index 2 this prior art technique also assumes that the received signal strength will not be significantly degraded during the 5.12 seconds between slots, an assumption that is even more difficult to maintain.

SUMMARY OF THE PREFERRED EMBODIMENTS

The foregoing and other problems are overcome, and other advantages are realized, in accordance with the presently preferred embodiments of these teachings.

In one aspect this invention provides a method to operate a mobile station. The method includes: (a) simultaneously demodulating a digital paging channel (DPCH) from individual ones of N base stations using a plurality of fingers, where N is greater than one; (b) soft combining the outputs of those fingers that receive the DPCH from an individual one of the N base stations and storing the combined soft outputs in an individual one of N buffers; and (c) separately decoding the content of each of the N buffers to determine if a page for the mobile station was received from at least one of the N base stations.

In another aspect this invention provides a mobile station that includes a radio frequency receiver for simultaneously receiving a digital paging channel from individual ones of N base stations, where N is greater than one; a plurality of pseudonoise PN code demodulators for simultaneously demodulating the digital paging channel DPCH received from individual ones of the N base stations; N soft combiners for soft combining the outputs of those PN code demodulators that receive the DPCH from an individual one of the N base stations; coupled to an output of each of the N soft combiners, one of N buffers for storing the combined soft outputs received from one of the N base stations; sequentially coupled to an output of each of the N buffers, a decoder for separately decoding the content of each of the N buffers to provide decoded data and a controller having an input coupled to an output of the decoder for determining from the decoded data if a page for the mobile station was received from at least one of the N base stations.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
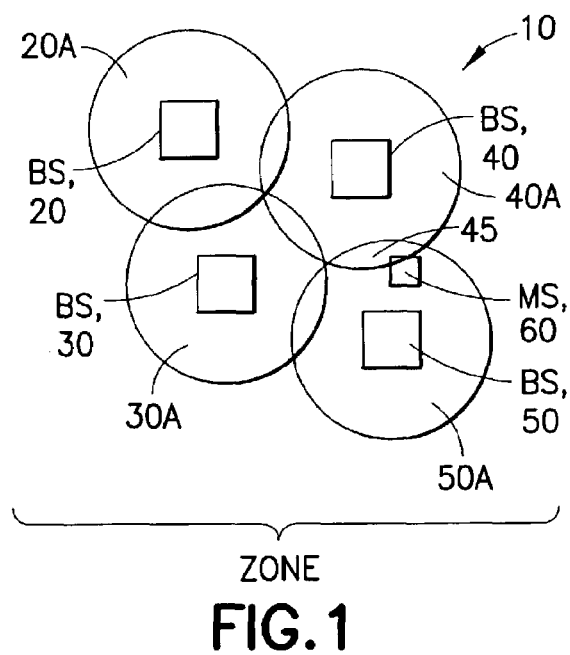
FIG. 1 is a high level diagram of a wireless telecommunications system having a plurality of base stations (BSs) and at least one mobile station (MS)

FIG. 1 shows a wireless telecommunications system 10 that includes a plurality of (e.g., four) base stations (BSs) 20, 30, 40, 50 that are capable of communication with a mobile station 60 when the mobile station 60 is located within, or adjacent to, a coverage area 20A, 30A, 40A, 50A of the each of the BSs 20, 30, 40, 50, respectively. Each base station is capable of supporting over radio frequency (RF) channels a plurality of digital traffic channels (DTCHs) and digital paging channels (DPCHs) within its coverage area. For the purposes of this invention the RF channels support a Spread Spectrum (SS), Code Division Multiple Access (CDMA) system that employs pseudonoise (PN) spreading codes in a manner well known in the art. The mobile station 60 may also be referred to then as a spread spectrum radiotelephone 60. Note in FIG. 1 that the MS 60 is located in an overlap region 45 between BSs 40 and 50, and is thus assumed to be capable of receiving signals from both. The four base stations (BSs) 20, 30, 40, 50 maybe assumed to lie in one zone, and to each transmit a page for the MS 60 during a same paging channel slot.

Figure 2:
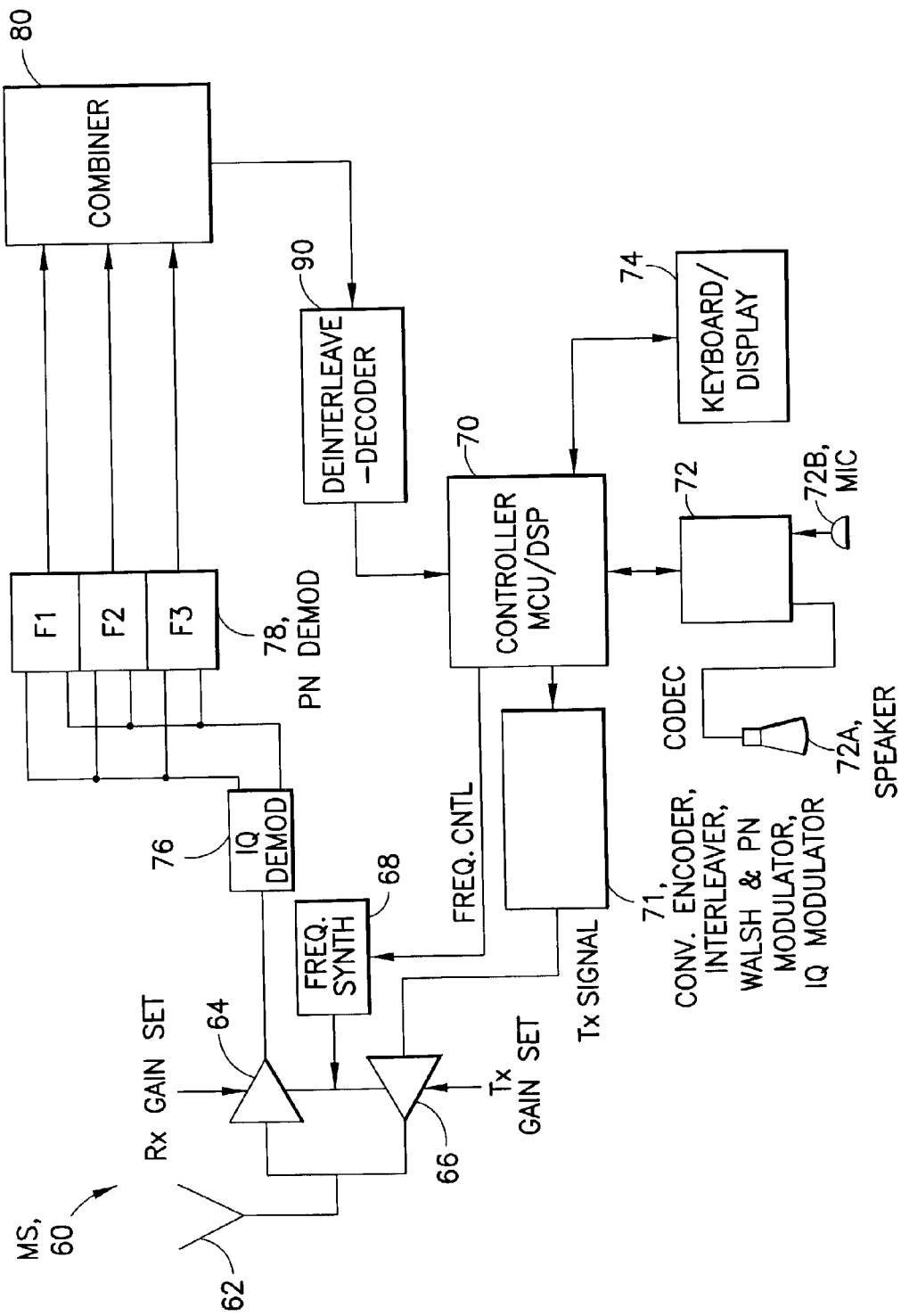
FIG. 2 is a block diagram that shows the MS of FIG. 1 in greater detail.

Referring now to FIG. 2, there is illustrated in greater detail the spread spectrum radiotelephone 60 that is suitable for practicing the multiple base station paging channel monitoring in accordance with this invention. Certain ones of the blocks of the radiotelephone 60 may be implemented with discrete circuit elements, or as software routines that are executed by a suitable digital data processor, such as a high speed digital signal processor (DSP). Alternatively, a combination of circuit elements and software routines can be employed. As such, the ensuing description is not intended to limit the application of this invention to any one particular technical embodiment.

In the preferred embodiment of this invention the spread spectrum radiotelephone 60 operates in accordance with a Direct Sequence, Spread Spectrum, Code Division Multiple Access technique, such as one known as, or derived or evolved from, TIA/EIA/IS-95A. However, compatibility with any one particular standard or air interface is not to be considered a limitation upon the practice of this invention.

The radiotelephone 60 includes an antenna 62 for receiving RF signals from a cell site or base station(s) 20, 30, 40, and for transmitting RF signals to the base station (s). When operating in the digital (spread spectrum or CDMA) mode the RF signals are phase modulated to convey speech and signaling information. Coupled to the antenna 62 are a gain controlled receiver 64 and a gain controlled transmitter 66 for receiving and for transmitting, respectively, the phase modulated RF signals. A frequency synthesizer 68 is controlled by a signal line from a controller 70 to provide the required frequencies to the receiver and transmitter. The controller 70 is comprised of a typically slower speed MCU for interfacing, via a codec 72, to a speaker 72A and a microphone 72B, and also to a keyboard and a display 74. In general, the MCU is responsible for the overall control and operation of the radiotelephone 60. The controller 70 is also preferably comprised of a higher speed digital signal processor (DSP) suitable for real-time processing of received and transmitted signals.

The received RF signals are converted to baseband in the receiver and are applied to a phase demodulator 76 which derives in-phase (I) and quadrature (Q) signals from the received signal. The I and Q signals are converted to digital representations by suitable A/D converters and applied to a multiple finger (e.g., three fingers F1–F3 in FIG. 2) correlator or demodulator 78, each of which includes a local pseudonoise (PN) code generator (not shown). The output of the demodulator 78 is applied to a combiner 80 which outputs a signal to the controller 70, via a deinterleaver and decoder 90. The digital signal input to the controller 70 is expressive of speech samples and/or signalling information.

An input to the transmitter 66 (vocoded speech and/or signalling information) is derived from the controller 70 via a convolutional encoder, interleaver, Walsh modulator, PN modulator and I–Q modulator, which are shown collectively as the block 71.

The decoder 90 is preferably a Viterbi decoder. Reference in this regard can be had, as an example, to commonly assigned U.S. Pat. No. 5,796,757, Methods and Apparatus for Performing Rate Determination with a Variable Rate Viterbi Decoder" S. Czaja, Aug. 18, 1998. The use of the Viterbi algorithm for decoding digital data in a communication channel is well described in the patent and general literature. Reference may be had, as examples, to the Viterbi decoders described in commonly-assigned U.S. Pat. No. 5,327,439, Jul. 5, 1994, K. Estola et al., and in European Patent Application 0446745A2 (18.09.91) by H. Jokinen et al. Reference can also be had to U.S. Pat. No. 5,375,129, "Maximum Likelihood Sequence Detector", A. Cooper, for a description of a Maximum Likelihood (ML) detector that uses the Viterbi algorithm for estimating a sequence of data bits received over a communication channel.

Figure 3:
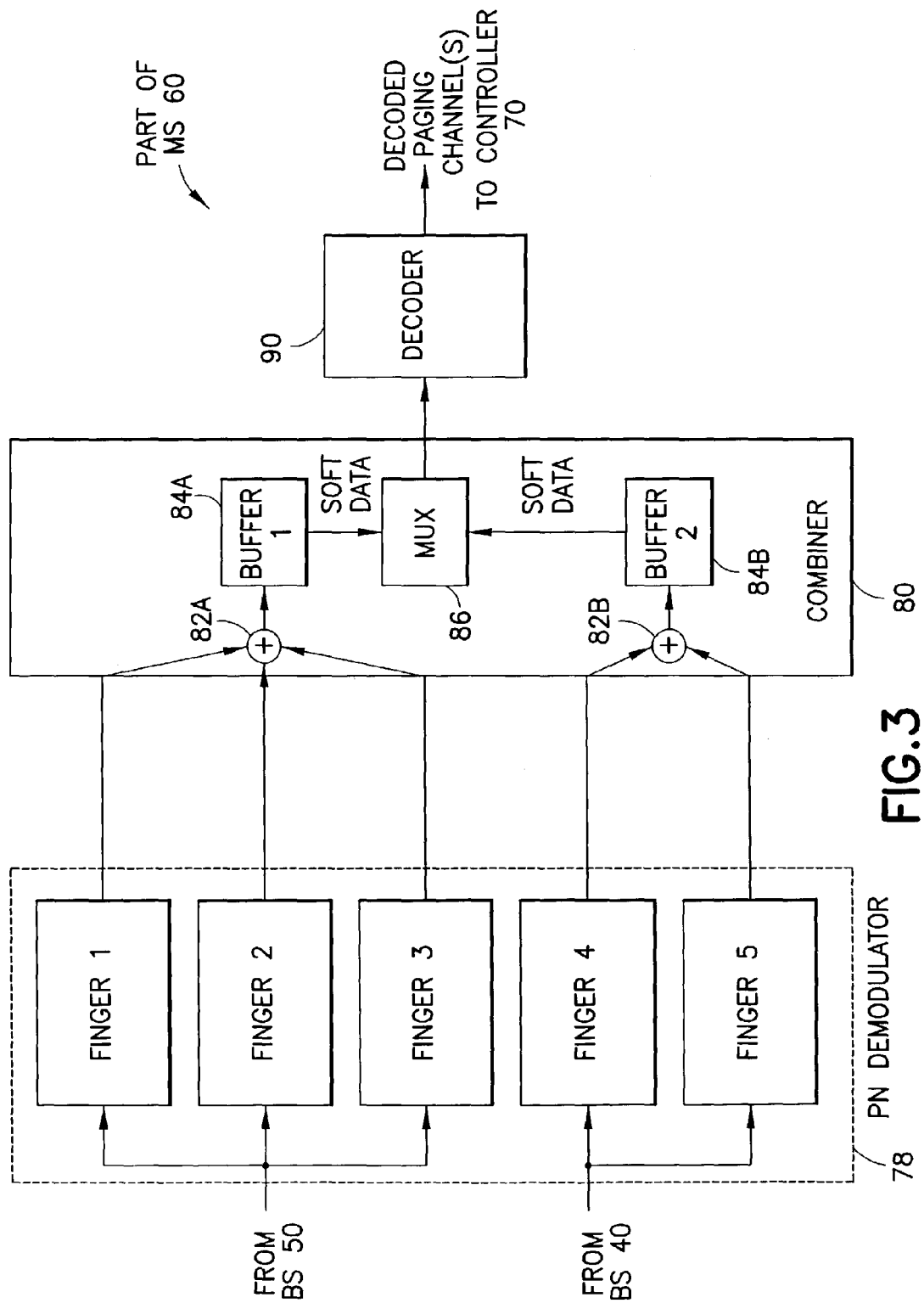
FIG. 3 is a block diagram that illustrates in greater detail the multi-finger PN demodulator, combiner and decoder blocks of FIG. 2.

FIG. 3 is a block diagram that illustrates in greater detail the multi-finger PN demodulator 78 (shown by example as a five finger demodulator), the combiner 80 and the decoder 90 of FIG. 2. In accordance with this invention the MS 60 monitors two or more paging channels from two or more base stations, such as the BSs 40 and 50 in FIG. 1. The combiner 80 is modified to combine soft data from the multiple base stations separately, indicated by the soft combiners 82A and 82B coupled to receive demodulated data from, for example, Fingers 1, 2 and 3 for BS 50, and to receive demodulated data from, for example, Fingers 4 and 5 for BS 40, respectively. The combined soft data is accumulated in separate buffers, designated Buffer_1 84A and Buffer_2 84B. A multiplexer (MUX) 86 operates to provide the accumulated soft data from the buffers 84A and 84B to the decoder 90 in sequence during a frame, such as a 20 millisecond frame. The Viterbi decoder 80 separately decodes the contents of the soft buffers 84A and 84B, and provides the decoded hard decision data to the controller 70 that, in turn, uses the decoded data to determine whether a page for the MS 60 has been received, as shown in FIG. 4.

Figure 4:
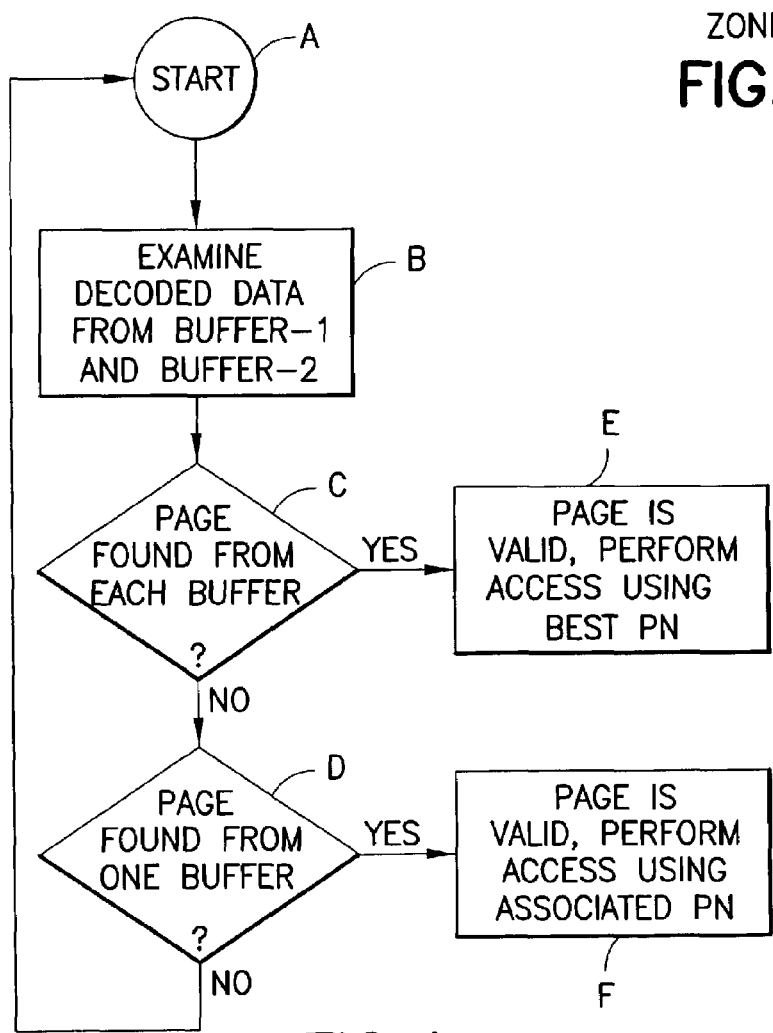
FIG. 4 is a logic flow diagram that shows a method in accordance with this invention.

Referring now also to FIG. 4, the controller 70 operates as follows. The Start block A is entered after receiving decoded data from the Viterbi decoder 90 for Buffer_1 84A and for Buffer_2 84B. The decoded data is examined at Block B. At Block C a determination is made if a page is found in each of the decoded data for Buffer_1 84A and Buffer_2 84B. If the determination is affirmative, control passes to Block E to declare that a valid page exists, and to initiate a wireless network access procedure using the transmitter circuitry 71 and 66 so as to eventually setup a traffic channel and begin the call (a voice or a data call). Preferably the network access procedure is started using the PN code associated with the base station having the "best" signal quality, for example, the one having the fewest symbol errors or the highest confidence, as determined by the Viterbi decoder 90. If the determination is negative at Block C, control passes to Block D to determine if a page was found in the decoded data from either Buffer_1 84A or Buffer_2 84B. If the determination is affirmative, control passes to Block F to declare that a valid page exists, and to start the network access procedure. In this case the network access procedure is started using the PN code associated with the base station having the successfully decoded data that indicates the presence of the valid page. If the determination is negative at Block D, which is typically the case, control passes back to Block A to await the receipt of the next decoded data from the decoder 90 for Buffer_1 84A and Buffer_2 84B.

In the foregoing method a valid page is assumed to exist if either, or both, of the Buffers 84A and 84B contain soft data indicating that a page has been received for the MS 60 from either, or both, of the BSs 40 and 50. This assumption is based on the further assumption that a given MS 60 will be paged by all of the base stations within a given zone during the same slot. The soft combining and accumulation of multipath data received from at least two of these base stations, and the separate decoding of the accumulated soft data, is preferred by this invention, as the BSs may transmit different data during the same paging channel slot, even though they synchronously share that same slot. That is, and unlike the case of a DTCH sent to the MS 60 from two BSs during soft handoff, the MS 60 cannot be assured that the data arriving in a DPCH from two BSs will be identical. Since this condition cannot be guaranteed, it thus becomes important to separately decode the combined soft paging channel data received during a slot from the two or more BSs, as described above with respect to this invention.

While described in the context of a SS-CDMA system, it should be appreciated that these teachings have applicability as well to other types of wireless systems where soft combining of received data is possible. Furthermore, these teachings need not be limited to synchronous wireless systems, as asynchronous wireless systems may benefit as well from their use. In addition, and as should be apparent, soft data of the DPCH from the multipath of individual base stations can be combined. The combined outputs from different base stations are preferably separately decoded, so long as sufficient buffer memory is available, and the Viterbi decoder 90 operates with a speed that is sufficient to process the combined soft data from each of the buffers. In addition, this invention does not require that multiple fingers be used for receiving the DPCH from each of the plurality of base stations. Furthermore, while described in the context of various numbers of base stations, slot index times and the like, it should be realized that these are exemplary, and are not to be construed in a limiting sense upon the practice of this invention.

What is claimed is:

1. A method to operate a mobile station to detect an incoming call, comprising:
   at the mobile station, simultaneously demodulating signals from a digital paging channel DPCH from individual ones of N base stations using a plurality of fingers, where N is greater than one;
   soft combining the outputs of those fingers that receive the DPCH from an individual one of the N base stations and storing the combined soft outputs in an individual one of N buffers;
   separately decoding the content of each of the N buffers to determine if a page signifying the incoming call to the mobile station was received from at least one of the N base stations; and
   if a page was received, determining, prior to initiating a network access procedure, which one of the at least one base stations to use when initiating the network access procedure.

2. A method as in claim 1, where if it is determined that a page for the mobile station was received from at least one of the N base stations, initiating a network access procedure in order to receive the incoming call.

3. A method as in claim 1, where if it is determined that a page for the mobile station was received from at least two of the N base stations, initiating a network access procedure in order to receive the incoming call, the network access procedure initiated through a base station of the at least two base stations having a best received signal quality.

4. A method as in claim 1, where if it is determined that a page for the mobile station was received from one of the N base stations, initiating a network access procedure through the one base station in order to receive the incoming call.

5. A method as in claim 1, where separately decoding the content of each of the N buffers comprises Viterbi decoding the content of each of the N buffers.

6. A mobile station, comprising:
   a radio frequency receiver for simultaneously receiving signals from a digital paging channel from individual ones of N base stations, where N is greater than one;
   coupled to an output of said RF receiver, a plurality of pseudonoise PN code demodulators for simultaneously demodulating said digital paging channel DPCH received from individual ones of said N base stations;
   coupled to outputs of said PN demodulators, N soft combiners for soft combining said outputs of those PN code demodulators that receive said DPCH from an individual one of said N base stations;
   coupled to an output of each of said N soft combiners, one of N buffers for storing said combined soft outputs received from one of said N base stations;
   sequentially coupled to an output of each of said N buffers, a decoder for separately decoding said content of each of said N buffers to provide decoded data; and
   a controller having an input coupled to an output of said decoder for determining from said decoded data if a page signifying an incoming call to said mobile station was received from at least one of said N base stations, the controller responsive to a page being received to determine, prior to initiating a network access procedure, which one of the at least one base stations to use when initiating the network access procedure.

7. A mobile station as in claim 6, where if said controller determines that a page for said mobile station was received from at least one of said N base stations, said controller initiates a network access procedure in order to receive the incoming call.

8. A mobile station as in claim 6, where if said controller determines that a page for said mobile station was received from at least two of said N base stations, said controller initiates a network access procedure in order to receive the incoming call, the network access procedure initiated through a base station of said at least two base stations having a best received signal quality.

9. A mobile station as in claim 6, where if said controller determines that a page for said mobile station was received from only one of said N base stations, said controller initiates a network access procedure through said one base station in order to receive the incoming call.

10. A mobile station as in claim 6, where said decoder comprises a Viterbi decoder.

11. A Spread Spectrum (SS), Code Division Multiple Access (CDMA) mobile station, comprising:
   a radio frequency receiver for periodically receiving, in accordance with an assigned slot index value, signals from a digital paging channel simultaneously from individual ones of N base stations, where N is greater than one;

coupled to an output of said RF receiver, a plurality of pseudonoise PN code demodulators for simultaneously demodulating said digital paging channel DPCH received from individual ones of said N base stations;

coupled to outputs of said PN demodulators, N soft combiners for soft combining said outputs of those PN code demodulators that receive said DPCH from an individual one of said N base stations;

coupled to an output of each of said N soft combiners, one of N buffers for storing said combined soft outputs received from one of said N base stations;

coupled to an output of each of said N buffers, a multiplexer for sequentially outputting a content of each of said N buffers;

coupled to an output of said multiplexer, a decoder for sequentially decoding said content of each of said N buffers to provide decoded data; and a controller having an input coupled to an output of said decoder for determining from said decoded data if a page signifying an incoming call to said mobile station was received from at least one of said N base stations, the controller responsive to a page being received to determine, prior to initiating a network access procedure, which one of the at least one base stations to use when initiating the network access procedure.

12. A mobile station as in claim 11, where said controller is responsive to determining that a page for said mobile station was received from at least one of said N base stations, for initiating a network access procedure in order to receive the incoming call.

13. A mobile station as in claim 11, where said controller is responsive to determining that a page for said mobile station was received from at least one of said N base stations, for initiating a network access procedure in order to receive the incoming call, the network access procedure initiated through a base station of said at least two base stations having a best received signal quality.

14. A mobile station as in claim 11, where said controller is responsive to determining that a page for said mobile station was received from one of said N base stations for initiating a network access procedure through said one base station in order to receive the incoming call.

15. A mobile station as in claim 11, where said decoder comprises a Viterbi decoder.

16. A mobile station comprising:

means for simultaneously demodulating signals from a digital paging channel DPCH from individual ones of N base stations using a plurality of fingers, where N is greater than one;

means for soft combining the outputs of those fingers that receive the DPCH from an individual one of the N base stations and storing the combined soft outputs in an individual one of N buffers;

means for separately decoding the content of each of the N buffers to determine if a page signifying an incoming call to the mobile station was received from at least one of the N base stations; and means, responsive to a page being received, for determining, prior to initiating a network access procedure, which one of the at least one base stations to use when initiating the network access procedure.

17. A mobile station as in claim 16, further comprising means, responsive to a determination that a page for the mobile station was received from at least two of the N base stations, for initiating a network access procedure in order to receive the incoming call, the network access procedure initiated through a base station of the at least two base stations having a best received signal quality.

18. A signal bearing medium tangibly embodying a program of machine-readable instructions executable by a processor to perform operations to operate a mobile station, the operations comprising:

at the mobile station, simultaneously demodulating signals from a digital paging channel DPCH from individual ones of N base stations using a plurality of fingers, where N is greater than one;

soft combining the outputs of those fingers that receive the DPCH from an individual one of the N base stations and storing the combined soft outputs in an individual one of N buffers;

separately decoding the content of each of the N buffers to determine if a page signifying the incoming call to the mobile station was received from at least one of the N base stations; and if a page was received, determining, prior to initiating a network access procedure, which one of the at least one base stations to use when initiating a network access procedure.

* * * * *